(12) United States Patent
Burdis et al.

(10) Patent No.: US 6,749,681 B1
(45) Date of Patent: Jun. 15, 2004

(54) METHOD OF PRODUCING CEMENT CLINKER AND ELECTRICITY

(75) Inventors: Vassilios Burdis, Butzbach (DE); Shin G. Kang, Simsbury, CT (US); Srivats Srinivasachar, Sturbridge, MA (US); Majed Toqan, La Celle St. Cloud (FR)

(73) Assignee: Alstom Technology LTD, Baden (SE)

( * ) Notice: Subject to any disclaimer, the term of this patent is extended or adjusted under 35 U.S.C. 154(b) by 105 days.

(21) Appl. No.: 10/070,931

(22) PCT Filed: Sep. 13, 2000

(86) PCT No.: PCT/CH00/00493
§ 371 (c)(1),
(2), (4) Date: Jun. 26, 2002

(87) PCT Pub. No.: WO01/19750
PCT Pub. Date: Mar. 22, 2001

(30) Foreign Application Priority Data

Sep. 16, 1999 (EP) .............................................. 99810828

(51) Int. Cl.[7] ................................................. C04B 7/36
(52) U.S. Cl. ........................ 106/744; 106/739; 106/761
(58) Field of Search ................................ 106/744, 739, 106/761

(56) References Cited

U.S. PATENT DOCUMENTS

| | | | |
|---|---|---|---|
| 4,402,754 A | * | 9/1983 | Schmidt et al. ............... 432/15 |
| 4,425,163 A | | 1/1984 | Schmidt et al. |
| 5,216,884 A | | 6/1993 | Holsiepe |
| 6,468,345 B1 | * | 10/2002 | Zhu et al. .................... 106/705 |

FOREIGN PATENT DOCUMENTS

| | | |
|---|---|---|
| CH | 689 830 A5 | 12/1999 |
| EP | 1092692 A1 | 4/2001 |

OTHER PUBLICATIONS

Database WPI. Section CH, Week 199231, Derwent Publications Ltd., London, GB, SU 1 675 254 A, publication Sep. 7, 1991, abstract only.

* cited by examiner

*Primary Examiner*—Paul Marcantoni
(74) *Attorney, Agent, or Firm*—Burns, Doane, Swecker & Mathis, L.L.P.

(57) ABSTRACT

In a method of producing cement clinker and electricity, cement raw mix and hydrocarbon are fed in a circulating fluidized bed boiler (1). Therein cement raw mix is calcined and steam is produced. Gas and solids out of the fluidized bed enter a cyclone (8), the solids being separated therein and returned to the bed. Part of those solids are first cooled down in a solids heat exchanger (9) producing steam. Fly ash consisting predominantly of lime and gas escaping the cyclone are passed through a heat exchanger (28, 33) and a filter (37). Hot bed material is discharged from the circulating fluidized bed and is ground with additives, then blended with lime being separated in the filter (37), then supplied to a rotary kiln (16), wherein the solids are clinkered. The produced steam is fed to a steam turbine island (42).

15 Claims, 1 Drawing Sheet

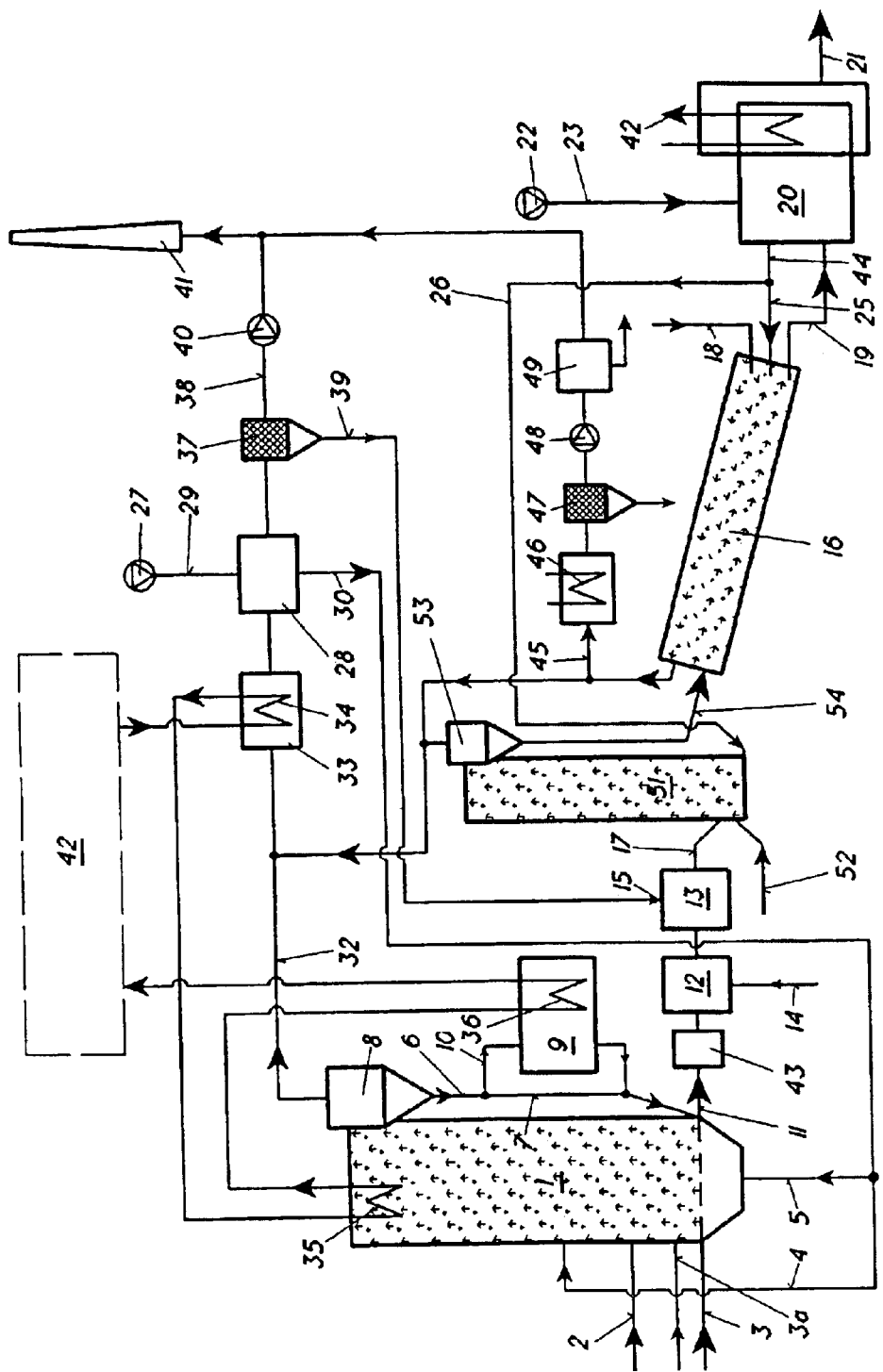

METHOD OF PRODUCING CEMENT CLINKER AND ELECTRICITY

FIELD OF THE INVENTION

The invention relates to a method of producing cement clinker and electricity, comprising feeding cement raw mix and hydrocarbon in a circulating fluidized bed, calcining the cement raw mix in the circulating fluidized bed and producing steam therein, discharging hot bed material in a rotary kiln, clinkering the calcined material in the rotary kiln and subsequently cooling the clinker, further comprising the gas and the solids out of the fluidized bed entering a cyclone, the solids being separated therein being returned to the bed, whereby part of those solids being first cooled down in a solids heat exchanger producing steam, whereas the gas and the fly ash escaping the cyclone being passed through at least one heat exchanger and through a filter, further comprising the produced steam being fed to a steam turbine island comprising a steam turbine being drivingly connected to a generator.

DISCUSSION OF BACKGROUND

U.S. Pat. No. 4,425,163 describes a method for producing cement clinker, in which raw cement powder is calcined to a level of at least 95% in a circulating fluidized bed and then clinkered in a rotary kiln. The circulation system comprises a fluidized bed reactor, a cyclone separator and a recycling duct. The carbonaceous fuel supplied to the calcining fluidized bed reactor is burnt near stoichiometrically in two stages with fluidizing gas and secondary gas. This method requires a preheating of the raw material in a suspension type heat exchanger.

A method of producing cement clinker and electricity as described above in the "field of the invention" is known from the article "Challenges of circulating fluid bed reactors in energy and raw material industries" by Lothar Reh, published in DECHEMA Deutsche Gesellschaft für chemisches Apparatewesen, Chemische Technik und Biotechnologie e.V., Frankfurt am Main. This article is based on a lecture held on the 6th International Conference on Circulating Fluidized Beds, in Würzburg, Germany on Aug. 22–27, 1999. This article describes trigeneration of cement, electricity and heat from high-ash coal using Circulating Fluidized Bed-Technology. Limestone and high-ash coal are separately prepared and ground before feeding them into the boiler. These two basic raw materials are proportioned online. Sulfur is completely bound into the bed material, which has the chemical composition of clinker. The hot bed material is discharged directly into a small rotary kiln. This direct use of ash substituting the clay component in cement avoids disposal of ash completely. This known method requires high performance cyclones in order to catch and recycle the pulverized limestone and/or lime and the grinding of the high-ash coal prior to its entry in the boiler.

SUMMARY OF THE INVENTION

Accordingly, the object of the invention is to provide a novel method and plant for integrating a cement clinker-burning unit into a hydrocarbon, especially coal-fired power plant, using circulating fluidized bed technology.

This is achieved, according to the invention, by following means feeding part of the cement raw mix in pulverized form,
designing the cyclone system so as the lime-rich fly ash obtained from calcination of limestone from the pulverized part of the cement raw mix escapes the cyclone system,
feeding the predominant part of the remaining part of the cement raw mix in crushed form for forming bed and circulating material,
and grinding the hot bed material as well as additives before blending them with lime being separated in the filter, obtained from calcination of limestone in the cement raw mix.

The advantages of the invention are to be seen in a significantly smaller number of cyclones leading to lower capital cost, because the cyclone system may have a larger cut size than the above mentioned prior art devices. It has a lower pressure drop, which leads to lower power consumption and lower operation cost. It also has a higher reliability due to the absence of fines in the material collected in the cyclone, which becomes easier to discharge. Another advantage is seen in the fact that there is no need to grind the fuel feed. Lastly the nitric oxide emissions are lower.

The discharged hot bed material may be cooled before grinding. This allows reliable operation of the downstream grinding equipment and gives an opportunity for further steam production.

The heat exchanger cooling the flue gas and the fly ash may be completely utilized for preheating air that is fed to the bed as fluidizing and overbed air. This requires only one piece of equipment, resulting in a high temperature driving force for steam generation in the remainder of the system. Another advantage is the short residence time of the gases and the fly ash in the heat exchanging apparatus, thus avoiding recarbonation of the lime to $CaCO_3$.

The at least one heat exchanger may also be a steam producer followed by the air heater. In this case, it is preferable to cool the gas and the fly ash escaping the cyclone and entering the steam producer at a fast rate in order to avoid recarbonation.

BRIEF DESCRIPTION OF THE INVENTION

A more complete appreciation of the invention and many of the attendant advantages thereof will be readily obtained as the same becomes better understood by reference to the following detailed description when considered in connection with the accompanying drawing, which illustrates diagrammatically an exemplary embodiment of the invention with coal as hydrocarbon. Only the elements essential for understanding the invention are shown. Arrows illustrate the flow direction of the working media.

DESCRIPTION OF THE PREFERRED EMBODIMENT

Referring now to the drawing, the equipment necessary for performing the cement and electricity production consists mainly of a circulating fluidized bed reactor 1, called hereafter CFB, a cement plant and a steam turbine island 42.

The equipment necessary for performing the cement production comprises mainly three blocks, namely the same CFB acting as a raw mix preheater and calciner, a kiln 16 and a clinker cooler 20. The basic idea is to have used the circulating fluidized bed combustor as steam boiler and as calciner for the cement raw mix.

Regarding the preheating of the air needed for cooling the cement clinker, for cinkering the cement raw mix, and for oxidizing the hydrocarbon, which is coal in this embodiment.

Via air intake line 23, ambient air is sucked in the system by a fan 22 to a clinker cooler 20 and heated therein by cooling down the cement clinker. The heated air exits the clinker cooler via line 44. This air is now divided into two streams. A first stream is supplied to the kiln 1.6 via line 25 as kiln combustion air. The second stream bypasses the kiln via line 26 and is fed into a riser tube 51 for combustion of fuel to preheat the cement raw mix.

Via air intake line 29 the major portion of ambient air is sucked by a fan 27 in the system. This air is preheated in an air preheater 28, which might be of the Ljungström-type. Via line 30 the air is fed to the combustor 1, in which it penetrates via a fluidizing air supply 5 and a secondary or overbed air supply 4.

Regarding the "Steam" Production

Depending on the apparatus type, the gas/air mixture can be introduced into the combustor on different levels. In the example shown on the drawing, in which the reactor is an upright circulating fluidized-bed steam generator with a flow stream from bottom to top, the fluidizing air is introduced at the bottom through an air distributor. The secondary air is fed through one or more elevations of ports in the lower combustor. The reactor is provided with four other inlets. One carbonaceous residue supply line 6, one inlet 2 for the coal and two inlets 3 and 3a for the raw cement mix.

Coal (and sorbent) is introduced mechanically or pneumatically to the lower portion of the reactor via supply 2. This coal can be either crushed or pulverized. Like the air, coal may be injected on different levels of the reactor. If the coal is in form of crushed material with a size of approximately 6-mm, it can be fed by gravity.

Combustion takes place throughout the combustor, which is filled by bed material. Flue gas and entrained solids leave the combustor and enter one or more cyclones 8, where the solids are separated.

The flue gas and the fly ash exit the gas outlet of the separation device 8 via a flue gas line 32. These separated gases are further treated before disposal. They are first cooled down in a gas cooler 33, thereby heating up water in an economizer 34 integrated in the water/steam cycle of a steam turbine island 42. In order to avoid recarbonation of the lime, the gases in line 32 are cooled at a fast rate, i.e. greater than 30° C./sec. Downstream the gases are further cooled in the air preheater 28. The gas is supposed to leave this gas cooler 28 with a temperature of about 100–150° C. Downstream the gas cooler a solids filter 37 is provided in the line 38 to remove from the gas all the remaining solids. This filter 37 could be a fabric filter or an electrostatic precipitator. A fan 40 is installed in the gas line exiting the filter, preferably on the clean side of the filter 37. Its purpose is to control the pressure in the system close to atmospheric conditions. The cleaned gas leaves the system via the stack 41. The solids separated in the filter 37 are a major feature of the invention. They are fed via line 39 to an appropriate location in the cement system.

The solids separated in the cyclone 8 are recycled to the combustor via line 6. The major portion is directly returned to the fluidizing bed via line 7. Some solid is diverted via line 10 to an external fluidized-bed heat exchanger 9 and then added to the portion in line 7. The bed temperature in the combustor 1 is essentially uniform and is maintained at an optimum level for sulfur capture and combustion efficiency by heat absorption in the walls of the combustor. In the present example the heat exchange is supposed to occur in an evaporator 35. Superheating of the steam and—for large steam turbine units with a reheat cycle—reheating is performed preferably by further heat removal from the hot solids absorption in the fluidized-bed heat exchanger 9 and/or in the gas-cooler 33. This heat exchanger 9 is containing immersed tube bundles. The flow rate of the solids through apparatus 9 via line 10 can be used to control the steam temperature. The produced superheated steam is fed to the turbine island 42 comprising at least one steam turbine driving a generator producing electrical power. Additional steam is produced for the turbine in the clinker cooler 20 from cooling the hot clinker discharged from the kiln 16 via line 19.

Sulfur compounds in the fuel or in the cement raw materials are mainly released in the CFB reactor 1 as $SO_2$. In traditional CFB steam production units, the amount of limestone needs to be minimized—Ca/S molar ratio typically around 2—to minimize operating costs. In the present method, Ca/S molar ratios greater than 3 can be used in the CFB to improve the sulfur capture from flue gas exiting the system via stack 41. No attendant increase in operating costs results since a very high amount of calcium relative to sulfur is inherent in the cement clinker making process. A very high sulfur removal efficiency (greater than 98%) in the flue gases in line 38 can also be achieved by re-injecting a portion of the lime-rich solids 39 into the flue gas leading to the filter 37 and by simultaneously controlling the relative humidity in the flue gas by moisture addition or temperature control. This might be necessary for high-sulfur fuels, where the portion of the sulfur in the cement raw mix released in kiln 16 and carried back to boiler flue gas 32 may be significant.

Regarding the Cement Production

A major feature of the invention is the integrated coproduction of power and cement, in which coproduction the ashes of the power production are used to replace part of the cement raw mix in the cement production. Indeed coal ashes are similar in composition to calcined clays. Moreover all of the coal residues are converted into cement, the sulfur is absorbed by clinker component CaO.

As described above, two inlets 3 and 3a for the raw cement mix are provided in the reactor 1. Via line 3, a part of limestone is fed into the reactor in pulverized form; typically 90% of the limestone particles are smaller than 90 microns, the size being appropriate for the cement clinkering process. Via line 3a the remaining part of crushed limestone is introduced to form bed and circulating material. At temperatures above about 800° C., limestone $CaCO_3$ is calcined into CaO. CaO combines with $SO_2$ released from coal combustion and oxygen to form gypsum $CaSO_4$. $SO_2$ can be disposed by standard wet or dry scrubbing methods using limestone. Enhanced dry scrubbing methods are included such as hydrating the calcined lime before introduction into the low temperature $SO_2$-laden flue gas stream and/or recirculating the calcium-rich solids from the filter back into the duct leading to the filter 37 and/or cooling the flue gas stream leading to the filter 37.

Draining off solids controls solids inventory in the combustor. The hot solids drained of the fluidizing bed via line 11 are cooled down through an ash cooler 43. They are introduced in a grinder 12 in which they are ground to an extent that 90% are below 90 μm. They are mixed with additives introduced in the grinder by a line 14 and with some of the cement raw mix (not shown). These corrective additives are used, if any essential chemical compound needed in the mixture of coal ash and limestone like iron oxide or silica content are not present in the required amount.

The ground material is supplied to a blender 15, in which is added the lime CaO via a supply 15. This amount of lime is constituted by the solids separated in the filter 37 and is fed via line 39. To achieve this amount of lime coming from filter 37, the cyclone 8 is designed to separate the predominant char and crushed cement material from the remaining components. Since the mean size of the ash and the lime is typically smaller than 50 μm it will escape the cyclone, while the char and the crushed lime/limestone, which is far greater in size will be retained in the cyclone. Thus the fly ash escaping the cyclone consists predominantly of lime and is forwarded with the flue gas in line 32.

In a preferred embodiment, the calcined raw mix may be preheated after the blender 13 before Introduction into the kiln 16. This allows decreasing the size of the kiln 16. The calcined raw mix of the correct size and composition for cement clinker making is then introduced into a riser tube 51 via line 17. To increase the cement raw mix temperature, a small amount of fuel is fired in the riser tube 51 along with preheated air coming from line 26 out of the clinker cooler 20. The fuel is supplied via a line 52. At its exit the tube connects the kiln exit and a cyclone 53. The cyclone 53 discharges the heated cement raw mix via line 54 into the kiln 16.

The gases leaving the cyclone 53 are mixed into line 32 with the flue gases leaving the CFB cyclone 8. Since the kiln 16 is typically operated under slightly negative pressure to avoid leakage of hot gases into the environment and since the inlet air for the CFB is required to be under positive pressure to overcome the pressure drop in the bed and freeboard, the kiln exhaust cannot be ducted to the CFB inlet. Instead, the kiln exhaust is added to flue gases leaving the CFB cyclone 8, where the pressure levels are compatible.

In the rotary kiln 16, the preheated and calcined raw mix is burnt into cement clinker. For combustion in the kiln 16, a small amount of fuel, i.e. coal is injected via a lance 18 together with the preheated air in line 25. The cement clinker—in form of nodules—is then forwarded via line 19 into a cement cooler 20, which might be a moving grate. Besides air preheating, in the present example is also shown steam production in the cement cooler. This steam may be injected in an appropriate location in the steam turbine island 42. The cooled clinker nodules are finally supplied to a cement grinder, which is not shown.

When using high sulfur fuels, a portion of the sulfur captured by the lime in the CFB reactor 1 would be released In the kiln 16 due to the high processing temperatures. It might also be necessary to control the sulfur content of the clinker to below a certain value (typically 2.5 to 3% $SO_3$) to obtain acceptable clinker quality. An acceptable sulfur content in the clinker can be achieved, for example, by controlling the level of oxidizing conditions In the kiln, with the $SO_2$ being released into the flue gas leaving the kiln. The flue gas stream exiting the kiln 16, relatively concentrated in $SO_2$, can be cost-effectively treated by taking a portion of it and cleaning it in a wet limestone scrubber to a valuable product gypsum, which can be added to the final cement product.

A bypass flue gas line 45 is connected to a flue gas cooler 46 and a filter 47. This filter could be an electrostatic precipitator wherein the entrained particles are separated, the coarse particles being returned to the process and the fine particles being separately disposed. A fan 48 and a limestone scrubber 49 follow the electrostatic precipitator downstream. The gas exit of the scrubber is connected to stack 11. Combining $CaCO3$ with $SO_2$ and oxygen form gypsum $CaSO4$ in the limestone scrubber. This gypsum can be used as an additive to ground clinker in the final cement product.

The invention may be illustrated in more detail with reference to a numerical example: It goes without saying that absolute values cannot be specified in connection with the said numerical values with regard to the dimensioning of the involved apparatus, since absolute values are in any case not meaningful enough on account of their dependence on numerous parameters.

For obtaining an electrical output of 220 MW and a cement output of 35 kg/sec, a total airflow of 233 kg/sec, coal in the amount of 23.3 kg/sec, limestone in the amount of 43 kg/sec and 8 kg/sec additives are needed. A higher ash coal will typically require fewer amounts of additives 220 kg/s of ambient air is sucked in by fan 27 to the air preheater 28 and is heated therein to 350° C. 12 kg/s of ambient air is sucked in by fan 22 into the clinker cooler. The air leaves the cooler at around 1100° C. The remainder of the cooling of the clinker nodules down to around 100° C. is accompanied with steam production for the turbine. From the air leaving the cooler, 3 kg/s are fed to the kiln via line 25 and 9 kg/s are bypassing the kiln via line 24 into the riser tube 51. The gas amount out of the kiln is about 4,4 kg/s at 1100° C. The total gas leaving the cyclone 53 is 14.3 kg/s and is combined with the flue gas leaving the CFB cyclone 8. The fluidizing air fed to the bed bottom via supply 5 is in the amount of 110 kg/s and the overbed air via supply 4 is in the amount of 110 kg/s. The flue gas in line 45 is in the amount of 1.0 kg/s at 1100° C. The temperature after the cooler 46 is 150° C.

Coal in the amount of 22 kg/s is injected in the CFB reactor 1 and in the amount of 0.4 kg/s is injected into the kiln 16. The latter is transported with 1 kg/s of primary air. Another 0.9 kg/s is injected in the riser tube 51. Pulverized limestone in the amount of 39 kg/sec and crushed limestone in the amount of 4 kg/sec are introduced in the reactor 1. In the fluidized bed reactor 2500–4600 kg/sec are typically circulated. The bed drain of the reactor is at about 3 kg/sec, the additives introduced in grinder 12 are at about 8 kg/sec and the lime separated In filter 37 and fed to blender 13 is in the amount of 24 kg/sec. Thus 35 kg/sec of calcined raw mix are supplied to the kiln.

The hot solids of the bed drain are cooled down in apparatus 42 to around 200° C. The gas and the solids exiting the reactor and entering the cyclone 8 have a temperature between 800 and 1200° C. An amount of 85% of the hot solids out of the cyclone 8 is returned uncooled to the reactor 1, while 15% are supplied to the fluidized bed heat exchanger 9 and cooled down therein to ca. 400° C. Of course this temperature depends on the amount of heat extracted for steam superheating or reheating.

Downstream the cyclone 8, the escaped gas is in the amount of 275 kg/sec and the escaped fly ash is in the amount of 24 kg/sec. In the example shown, the gas and the fly ash are cooled down in the steam heat exchanger 33 to 350° C. and further in the air cooler 28 to 100° C.

It might be that about 0.5 kg/s carbon is contained in the fly ash. This carbon is separated in the filter 37 with the lime and fed to the kiln. In this case either the coal amount to the kiln has to be reduced appropriately or the amount of air through the kiln has to be augmented to bum the supplemental 0.5 kg/sec carbon.

Of course, the invention is not restricted to the plant shown and described. The invention can be used irrespective of the type and design of the combustor. This combustor could as well be an apparatus with entrained flow, if a pulverized fuel is used. Instead of cyclones, separating apparatus with moving bed could be used as well. A larger air cooler could replace the steam heat exchanger 33 and the air cooler 28. This would preheat the air in line 29/30 to about 750° C. and provide a high temperature driving force for steam generation in apparatus 35 and 36. It is understood that—depending on the amount of heat being available and being extracted—preheating, evaporating, superheating and reheating may occur in all apparatus 34, 35 and 36 and in the clinker cooler 20.

Obviously, numerous modifications and variations of the present invention are possible in light of the above teachings. It is therefore to be understood that, within the scope of the appended claims, the invention may be practiced otherwise than as specifically described herein.

List of Designations 1 circulating fluidized bed
2 hydrocarbon feed line
3, 3a limestone feed line
4 secondary (overbed) air line to 1
5 fluidizing air supply
6 solids return line
7 solids return line bypassing 9
8 cyclone
9 fluidized bed heat exchanger
10 solids return line to 9
11 hot bed material discharge
12 grinder
13 blender
14 additive supply to 12
15 lime supply to 13
16 kiln
17 calcined material line to 51
18 fuel supply to 16, coal
19 kiln clinker discharge line, nodules
20 clinker cooler
21 line to clinker grinder
22 fan
23 air supply to 20
25 air supply to 16
26 air line bypassing kiln 16
27 fan
28 air heater
29 air supply to air heater
30 hot air discharge from air heater, air supply to 1
32 gas and fly ash line
33 steam heat exchanger
34 economizer
35 evaporator
36 superheater and reheater
37 filter, electrostatic precipitator
38 gas exhaust line
39 lime discharge line from 37
40 fan
41 stack
42 steam turbine island
43 hot solids cooler
44 second air discharge from 20
45 bypass flue gas from kiln 16
46 flue gas cooler
47 filter
48 fan
49 limestone scrubber
51 riser tube
52 coal supply to 51
53 cyclone of 51
54 calcined material line to 16

What is claimed is:

1. In a method of producing cement clinker and electricity, comprising feeding cement raw mix and hydrocarbon in a circulating fluidized bed, calcining the cement raw mix in the circulating fluidized bed and producing steam therein, discharging hot bed material in a rotary kiln, clinkering the calcined material in the rotary kiln and subsequently cooling the clinker, further comprising the gas and the solids out of the fluidized bed entering a cyclone, the solids being separated therein being returned to the bed, whereby part of those solids being first cooled down in a solids heat exchanger producing steam, whereas the gas and the fly ash escaping the cyclone being passed through at least one heat exchanger and through a filter, further comprising the produced steam being fed to a steam turbine island comprising a steam turbine being drivingly connected to a generator, the improvement comprising feeding part of the cement raw mix in pulverized form,
lime-rich fly ash obtained from calcination of limestone from the pulverized part of the cement raw mix escaping the cyclone system,
feeding the predominant part of the remaining part of the cement raw mix in crushed form for forming bed and circulating material,
and grinding the hot bed material as well as additives before blending them with lime being separated in the filter, separated in the filter, obtained from calcination of limestone in the cement raw mix.

2. A process according to claim 1, wherein the discharged hot bed material is cooled before grinding.

3. A process according to claim 1, wherein the calcined pulverized lime escaped from the cyclone and separated in the filter is supplied to the clinkering process.

4. A process according to claim 1, wherein carbon contained in the fly ash escaped from the cyclone and separated in the filter and the carbon added via discharged hot bed material is supplied to the clinkering process as a fuel.

5. A process according to claim 4, wherein the total amount of combustible material needed for the clinkering process is controlled in function of the carbon added via the filter and the carbon added via the discharged hot bed material.

6. A process according to claim 4, wherein the amount of combustion air needed for the clinkering process is controlled in function of the additional carbon separated in the filter and the carbon added via the discharged hot bed material.

7. A process according to claim 3, wherein part of the calcined pulverized lime escaped from the cyclone and separated in the filter is re-injected into a line upstream the filter to improve sulfur removal efficiency by simultaneously controlling the relative humidity in the flue gas.

8. A process according to claim 1, wherein the calcined raw mix is preheated before entering the clinkering process.

9. A process according to claim 4, wherein the gas and the fly ash escaping the cyclone and entering the steam producer are cooled at a fast rate in order to avoid recarbonation of lime.

10. A process according to claim 1, wherein the exhaust gases from the kiln and the cyclone are added to the gases exhausting the circulating fluidized bed cyclone in order to match pressure conditions.

11. A process according to claim 1, wherein the predominant portion of the sensible heat in the clinker exiting the clinkering process is used for generating steam.

12. A process according to claim 1, wherein part of the flue gas discharged from clinkering process is passed through a scrubber, wherein gypsum is produced.

13. A process according to claim 1, wherein the at least one heat exchanger is utilized for preheating air being fed to the bed as fluidizing air and overbed air.

14. A process according to claim 1, wherein the at least one heat exchanger is a steam producer followed by an air heater.

15. A process according to claim 1, wherein the part of the cement raw mix fed in pulverized form into the circulating fluidized bed is the predominant part.

* * * * *